(12) United States Patent
Macsay et al.

(10) Patent No.: US 7,743,509 B2
(45) Date of Patent: Jun. 29, 2010

(54) RATCHETING HAND TOOL WITH EASILY REPLACEABLE CUTTING BLADE

(75) Inventors: Steven M. Macsay, Strongsville, OH (US); Brian M. Adkins, Lorain, OH (US)

(73) Assignee: Emerson Electric Co., St. Louis, MO (US)

( * ) Notice: Subject to any disclaimer, the term of this patent is extended or adjusted under 35 U.S.C. 154(b) by 155 days.

(21) Appl. No.: 11/818,406

(22) Filed: Jun. 14, 2007

(65) Prior Publication Data

US 2008/0307657 A1     Dec. 18, 2008

(51) Int. Cl.
*B26B 13/00* (2006.01)
*B23D 21/06* (2006.01)

(52) U.S. Cl. ............ 30/92; 30/98; 30/99; 30/192; 30/251

(58) Field of Classification Search ............ 30/99, 30/98, 96, 250, 251, 192, 244, 92, 255; 81/314
See application file for complete search history.

(56) References Cited

U.S. PATENT DOCUMENTS

| | | | |
|---|---|---|---|
| 4,178,682 A | 12/1979 | Sadauskas |
| 4,312,127 A | 1/1982 | Tanaka |
| 4,378,636 A | 4/1983 | Wick |
| 4,599,795 A | 7/1986 | Yokoyama |
| 4,674,184 A | 6/1987 | Anderson |
| 5,231,763 A | 8/1993 | Laux |

(Continued)

FOREIGN PATENT DOCUMENTS

DE        29801199        3/1998

(Continued)

OTHER PUBLICATIONS

Notification of Transmittal of the International Search Report and the Written Opinion of the International Searching Authority, or the Declaration, Jul. 21, 2008 (2 pages).

(Continued)

*Primary Examiner*—Boyer D Ashley
*Assistant Examiner*—Omar Flores-Sánchez
(74) *Attorney, Agent, or Firm*—Rankin, Hill & Clark LLP

(57) ABSTRACT

A hand-held and hand-operated cutting tool particularly well suited for cleanly and quickly cutting plastic pipe or tubing, rubber hose, or the like is provided. The tool has a blade which is easily manually removed from and replaced into the cutting tool without the use of additional tools. The blade is slid into the tool and then rotated slightly into an initial operating or loaded position whereat a blade pivot pin may be inserted into the tool and through a hole provided in the blade. During use, the blade is rotatable in increments or steps from a retracted position in which it is substantially enclosed within the tool housing to a cut off position in which it cooperates with a stationary cradle anvil so as to sever the article to be cut. A ratchet drive interconnects a movable handle and the blade so as to incrementally drive the blade towards its cut off position upon manipulation of the handle. Upon severing of the article, the blade is readily returned to its retracted position by, for example, spreading apart the tool handles.

13 Claims, 14 Drawing Sheets

U.S. PATENT DOCUMENTS

| | | | |
|---|---|---|---|
| 5,307,565 A * | 5/1994 | Erbrick et al. | 30/251 |
| D384,869 S | 10/1997 | Aubriot | |
| 5,718,051 A | 2/1998 | Huang | |
| 6,098,291 A | 8/2000 | Wang | |
| 6,766,581 B2 * | 7/2004 | Nordlin | 30/252 |
| 7,127,819 B1 * | 10/2006 | Huang | 30/92 |
| 2004/0134073 A1 * | 7/2004 | Kochi | 30/92 |

FOREIGN PATENT DOCUMENTS

| | | |
|---|---|---|
| FR | 2698570 | 6/1994 |

OTHER PUBLICATIONS

International Search Report, Jul. 21, 2008 (4 pages).
Written Opinion of the International Searching Authority, Jul. 21, 2008 (7 pages).

* cited by examiner

RATCHETING HAND TOOL WITH EASILY REPLACEABLE CUTTING BLADE

BACKGROUND

This application relates to the art of cutting devices and, more specifically, to hand tools and blades therefor for cutting workpieces including those having a circular cross section such as plastic pipe or tubing, rubber hose, or other similar non-metallic materials. Although the preferred embodiments will be described in connection with a ratchet-type tubing cutter apparatus for cutting plastic tubes by hand and to a blade therefor, it is to be appreciated that the embodiments have application in other areas including a wide range of manual as well as powered devices for cutting, clipping, or otherwise applying forces to associated workpieces.

A wide variety of tubing cutters have been provided heretofore for cutting plastic tubing of the character used in commercial and domestic water systems, such as schedule 40 PVC tubing for example. Such cutters have included scissors-type cutters such as that shown in U.S. Pat. No. 6,513,245 to Aubriot and U.S. Pat. No. 6,658,738 to King wherein a tube to be cut is supported in a cradle portion of the cutter and a blade is displaceable about a fixed pivot axis to cut a tube interposed between the cradle and blade. In the King patent, the pivot axis is adjustable to accommodate the cutting of tubes of different diameter.

The scissors-type cutters which require a squeezing action of the handles require an excessive effort on the part of the user to achieve a cutting operation, especially with large diameter tubing. Partly in this respect, these tools require the user to rock or rotate the tube and cutter in opposite directions while squeezing the handles to apply a cutting load. Furthermore, with initially cutting through a larger diameter tube, a user who has a small hand span has difficulty in applying the necessary closing force on the handles to achieve initial cutting of the tube and, often, has to grasp the handles with both hands to initiate cutting.

Another type of tubing cutter heretofore available includes a cradle for supporting a tube to be cut and a pivotal cutting jaw or blade which is intermittently displaced toward the cradle by means of a ratchet mechanism. One such example is U.S. Pat. No. 4,368,577 to Babb which shows a tool having a blade rotatable in increments or steps from a retracted position in which the blade is enclosed within a housing, to a cut off position in which the blade cooperates with a stationary anvil so as to sever the article to be cut. A ratchet drive interconnects a movable handle and the blade so as to incrementally drive the blade toward its cut off position upon manipulation of the handle. A pawl prevents opening of the blade caused by the springiness of the article being cut upon being engaged by the blade. The blade is returned after cutting the object to its retracted position by releasing a thumb operated locking pawl. Other ratchet cutters have been proposed as well such as, for example, those shown in U.S. Pat. No. 4,312,127 to Tanaka and U.S. Pat. No. 4,674,184 to Anderson.

The ratchet mechanisms provided in the ratchet-type hand cutting tools described above allow a smaller stroke of the cutter handles relative to one another for each intermittent cut, whereby users without a large hand span can operate the cutter. However, the cutters are somewhat structurally complex particularly with respect to the mechanisms used for mounting of the cutter blades. Also, in these prior art device, blade maintenance including blade removal and replacement is cumbersome for the users. More particularly, the ratchet cutters described above must be first partially disassembled in order to remove and replace the cutter blade. Users of these tools have learned that this is not a quick or easy process. At best, some ratchet cutters require the removal of a blade screw/pin and a disconnection of a blade spring from attachment with the blade. Typically, the blade screws/pins are made of a threaded bolt and nut arrangement often including additional biasing and locking washers and springs to load against the blade. Further, additionally, the spring is often hooked or otherwise fastened onto the blade using a special connection and is typically held under tension in order to pre-load the blade in its returned or retracted position. Thus, when replacing or otherwise servicing the blade, the spring must be first stretched by some means and then connected with the blade. Again, typically, this is not an easy process, particularly when there is a need to replace the blade at a job site. Still further, oftentimes tools are needed together with adequate time and a fair amount of specialized experience in order to replace the cutting blade in typical ratchet tubing cutters.

BRIEF DESCRIPTION

In accordance with the present application, an improved ratchet tubing cutter is provided, especially for plastic tubing of the type mentioned above, which includes a cutter blade which is easily replaceable manually and without the need for additional tools. More particularly in this respect, the manual cutting tool is characterized by a first handle member defining a first hand grip portion on a first end and a workpiece cradle portion on the second opposite end. A pin member is selectively carried on the first handle member. A second handle member defines a second hand grip portion on a first end and is pivotably connected on a second end thereof with the first handle member. A blade sleeve member is carried on the first handle member and is biased to a first position relative to the first handle member. A drive pawl is carried on the second handle member, and a cutter blade is carried on the pin member. The cutter blade includes a flat main body member defining an outer edge; a cutting edge defined by a cutting portion of the outer edge, a plurality of spaced apart teeth defined by a toothed portion of the outer edge, the plurality of teeth being configured to selectively engage the drive pawl of the cutting tool, a slot defined by a slot portion of the outer edge, the slot portion being configured to selectively receive the blade sleeve member when the cutter blade is installed into the first handle member; and an attachment portion on the main body member, the attachment portion being configured to selectively couple with the pin member for pivotally connecting the cutter blade with the cutting tool.

In accordance with another aspect of the application, an improved cutter blade is provided, especially for use in a ratchet cutting tool of the type described herein. In this aspect of the application, the cutting blade has a shape which enables the cutting blade to be easily removed from and inserted into the cutting tool by simply manually removing and inserting a snap lock pin and by sliding the blade into operative position. Thereby, blade replacement can be performed by the user without the need for additional associated tools. More particularly, in this respect, the blade is characterized by a flat main body member defining an outer edge; a cutting edge defined by a cutting portion of the outer edge, a plurality of spaced apart teeth defined by a toothed portion of the outer edge, the plurality of teeth being configured to selectively engage the drive pawl of the cutting tool, a slot defined by a slot portion of the outer edge, the slot portion being configured to selectively receive the blade sleeve member when the cutter blade is installed into the first handle member; and an attachment portion on the main body member, the attachment portion being configured to selectively couple with the pin member for pivotally connecting the cutter blade with the cutting tool.

It is accordingly an overarching object of the present application to provide an improved ratchet tubing cutter having a cutting blade therefor which is easily replaceable without the need for additional tools.

Another object is the provision of an improved cutting blade for use in a ratchet tubing cutter of the character described above.

Other objects, advantages and benefits of the subject ratchet tubing cutter and blade therefor will become apparent to those of ordinary skill in the art upon reading and understanding of the following detailed description of the preferred embodiments.

BRIEF DESCRIPTION OF THE DRAWINGS

The drawings are only for purposes of illustrating embodiments of the invention and are not to be construed as limiting the invention, which is defined by the appended claims.

DETAILED DESCRIPTION

Figure 1:
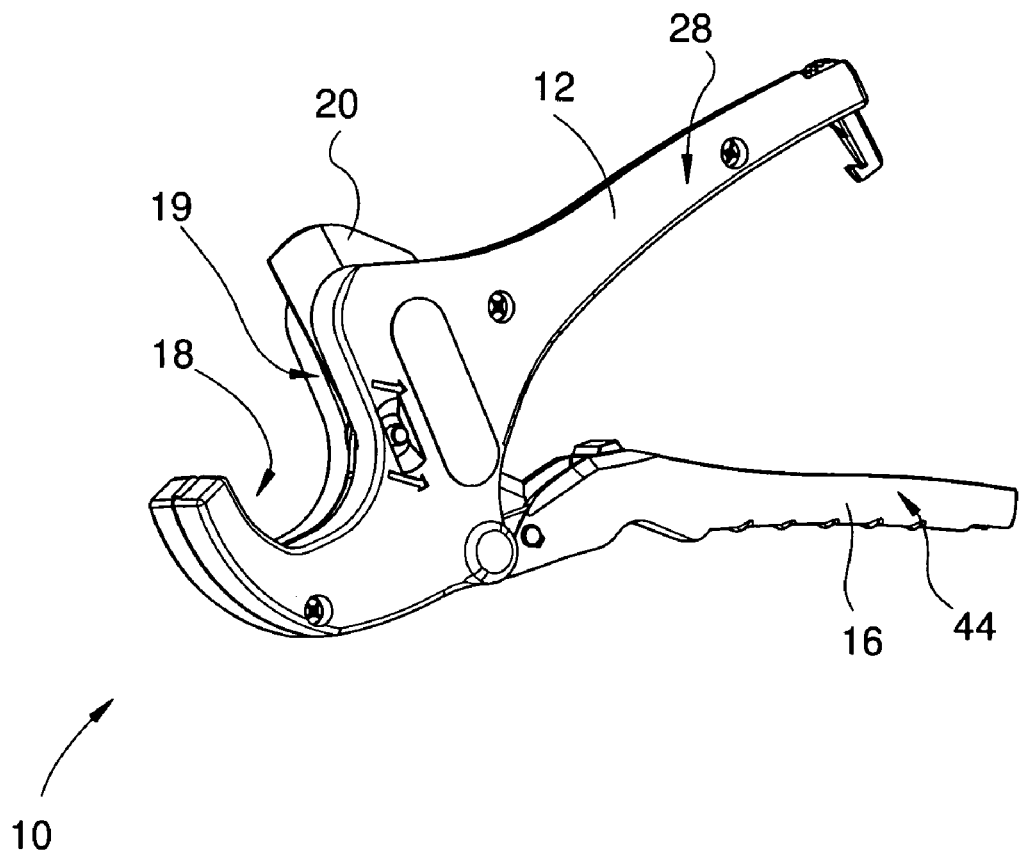
FIG. 1 is a perspective view of a ratchet tubing cutter in accordance with the preferred embodiment.
Figure 2:
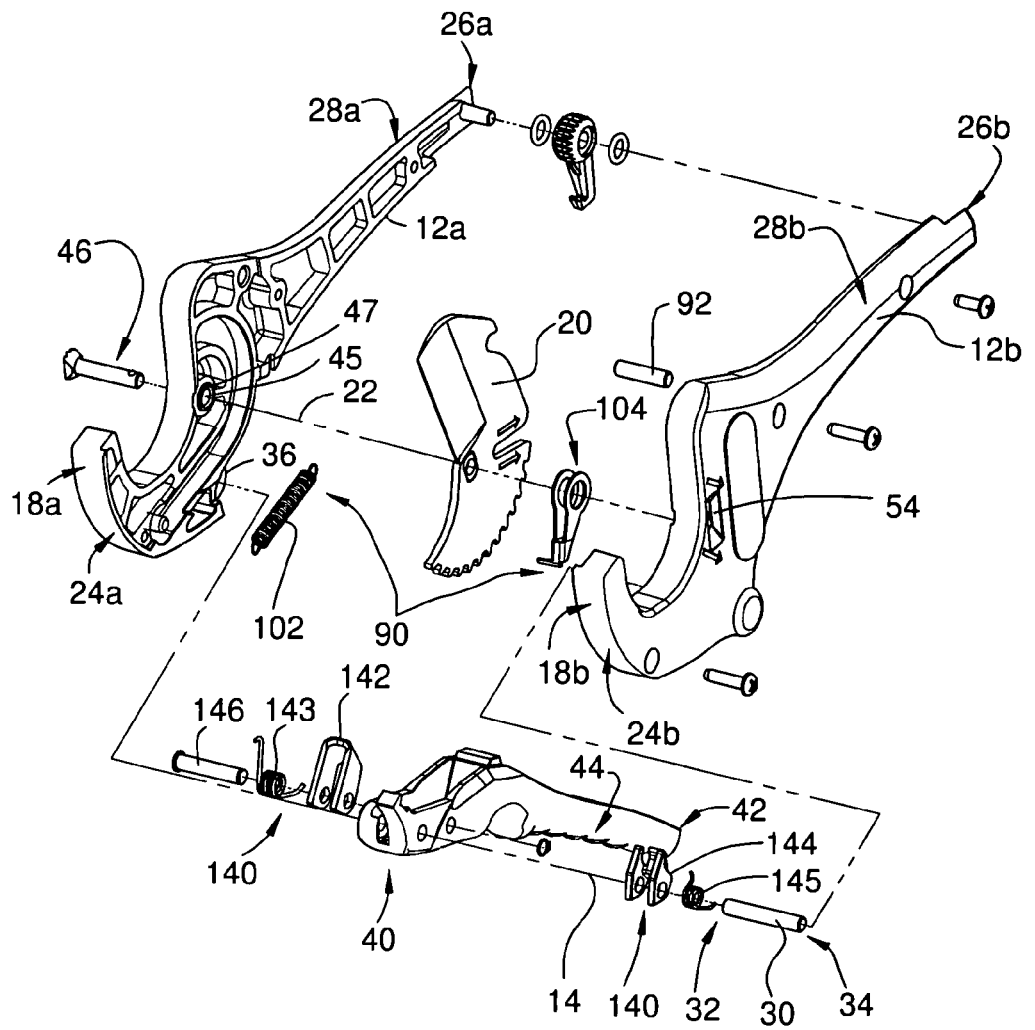
FIG. 2 is an exploded perspective view of the ratchet tubing cutter in accordance with the present application and as shown in FIG. 1.

Referring now in greater detail to the drawings, wherein the showings are for the purpose of illustrating the preferred embodiments of the present invention only and not for purposes of limiting same, FIG. 1 provides a perspective view of the subject ratchet tubing cutter apparatus 10 in a fully opened position and FIG. 2 provides an exploded perspective view illustrating the various preferred components thereof and their preferred arrangement in the subject tool.

As shown in those FIGURES, the preferred form of the ratchet tubing cutter 10 comprises a first elongate member 12 pivotally attached at a handle axis 14 with a second elongate member 16, and a cutter blade 20 pivotally attached at a blade axis 22. In the preferred embodiment illustrated, the first elongate member 12 is defined by handle halves 12a and 12b, each of which has a first end 24a, 24b and an opposite second end 26a, 26b, respectively. The first ends 24a, 24b are provided with corresponding arcuate cradle portions 18a, 18b which, when the ratchet cutter is assembled, provide a cradle area 18 for supporting a tube or other workpiece to be cut. It is to be appreciated that although a cradle portion is illustrated, the workpiece can be held in place during cutting using other forms as well such as an anvil-like holding portion, straps, attaching members, flat or angled portions, or by any other means. The second ends 26a, 26b of the first elongate member 12 are provided with first handle portions 28a, 28b collectively forming a first handle used for gripping the ratchet cutting tool 10 during use thereof.

Still further, in the preferred embodiment illustrated, the ratchet cutting tool 10 includes a second elongate member 16 pivotally connected with the first elongate member 12 by a pin 30 having opposite first and second ends 32, 34 received in opposed pin supports 36 provided in each of the handle halves 12a, 12b, only one of which is visible in FIG. 2, whereby the second elongate member 16 and the pivot pin 30 are captured between the assembled handle halves 12a, 12b. Overall, the second elongate member 16 includes first and second ends 40, 42, the first end 40 being pivotally attached with the first elongate member 12 at the handle axis 14 and the second free end 42 defining a second handle portion 44 of the tool. The second handle portion 44 is configured to complement the first handle portion 28 and together are useful for gripping and operating the subject ratchet tool 10 by hand.

Somewhat centrally located in the first elongate member 12 is arranged a cutter blade receiving portion 90 for receiving and guiding movement of the cutter blade 20 relative to the first and second elongate members 12, 16 in a manner to be described in greater detail below to enable easy manual removal and replacement of the cutter blade without the use of additional tools such as wrenches, screw drivers, or the like. During installation, the blade is slid into a gap 19 formed between the handle halves 12a, 12b and is then slightly rotated about a fixed blade locating pin 92 to locate the blade within the tool in an operative position. A manual self locking pivot pin 46 is inserted into the handle halves 12a, 12b and passes through a hole formed in the blade. The pin 46 holds the blade in place during use of the tool. In addition, located somewhat at the first end 40 of the second elongate member 16 is provided a cutter blade ratchet mechanism 140 for guiding rotatable movement of the cutter blade 20 in increments or steps from a retracted position in which it is enclosed substantially within the first elongate member 12 to an extended or cut off position in which it cooperates with the stationary anvil or cradle portions 18a, 18b so as to sever the article to the cut. The cutter blade ratchet mechanism 140 will be described in greater detail below.

Figure 4:
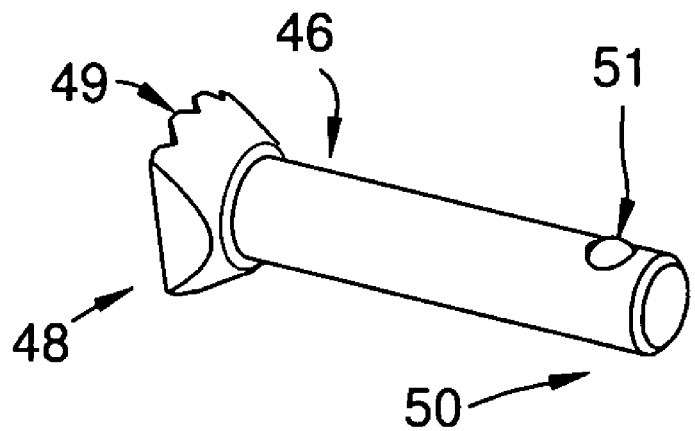
FIG. 4 is a perspective view of the blade pivot pin of the ratchet tubing cutter of FIGS. 1 and 2.
Figure 5:
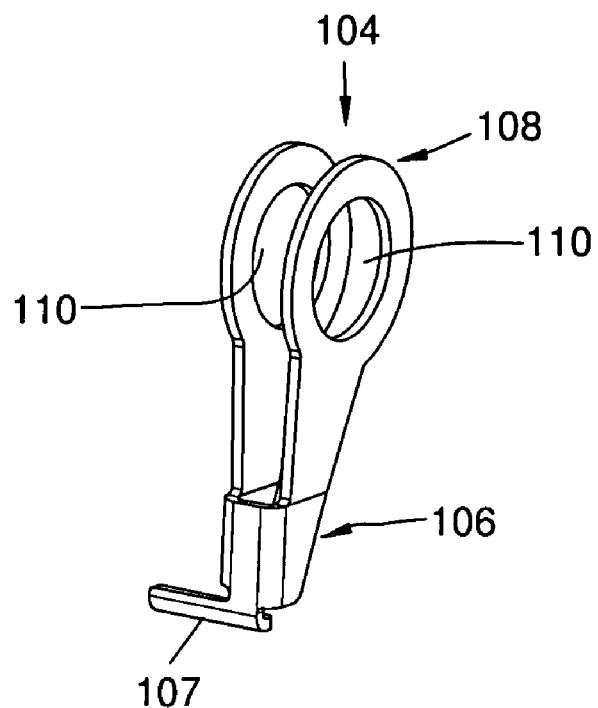
FIG. 5 is a perspective view of the blade sleeve of the ratchet tubing cutter of FIGS. 1 and 2.

The ratchet cutting tool 10 further includes a cutter blade 20 pivotally mounted on the first elongate member 12 in the embodiment illustrated by means of a blade pivot pin 46 which extends through a blade pin opening 66 in the cutter blade 20. The blade pivot pin 46 is shown in FIG. 2 in its preferred arrangement in the subject tool in an exploded view, and in FIG. 4 in an enlarged perspective view. Generally, the blade pivot pin 46 has opposite first and second ends 48, 50. The first end 48 of the blade pin 46 is selectively received in a pin support 45 defined by the first elongate member 12a. Further, the first end 48 defines a knurled and contoured grip head portion 49 including a knurled flat top portion for adapting the pin to be easily pushed into the tool such as by using a thumb, and a contoured shoulder portion for adapting the pin 46 to be easily gripped using fingers for extracting the pin 46 from the tool 10 for blade 20 replacement. For extraction, it is most convenient to first dislodge the pin slightly such as by pushing on the second end 50 thereof to unseat the head portion 49 thereby enabling finger access to the contoured underside portion thereof.

When selectively fully inserted and in an operative position, the second end 50 of the pin 46 extends through a passageway 54 defined in the other of the elongate member 12b. In this manner, the cutter blade 20 is carried on and movable about the blade pivot pin 46 in a blade axis 22 substantially aligned in parallel with the handle axis 14. The blade pin 46 is preferably held in place in an operative position by one or more ball detents 51 carried on the second end 50 of the pin. In the embodiment illustrated, a single ball detent 51 is carried on the second end 50 of the pin 46 at a position along the length of the pin such that it will locate beyond the passageway 54 when the grip head position 49 of the pin 46 is fully seated against the first elongate member 12a. In this position the ball detent 51 expands outwardly in opposite directions adjacent the passageway 54, thereby selectively locking the pin 46 in its operative position. Further, it is to be appreciated by those skilled in the art that when mounted on the pin 46, the cutter blade 20 is pivotally movable in a plane extending perpendicular with each of the handle and cutter blade axes 14, 22. Also, the blade pivot pin 46 is selectively removable from connection with the first elongate member 12a by manually withdrawing the pin therefrom thereby releasing the cutter blade 20 from the tool 10.

Figure 3:
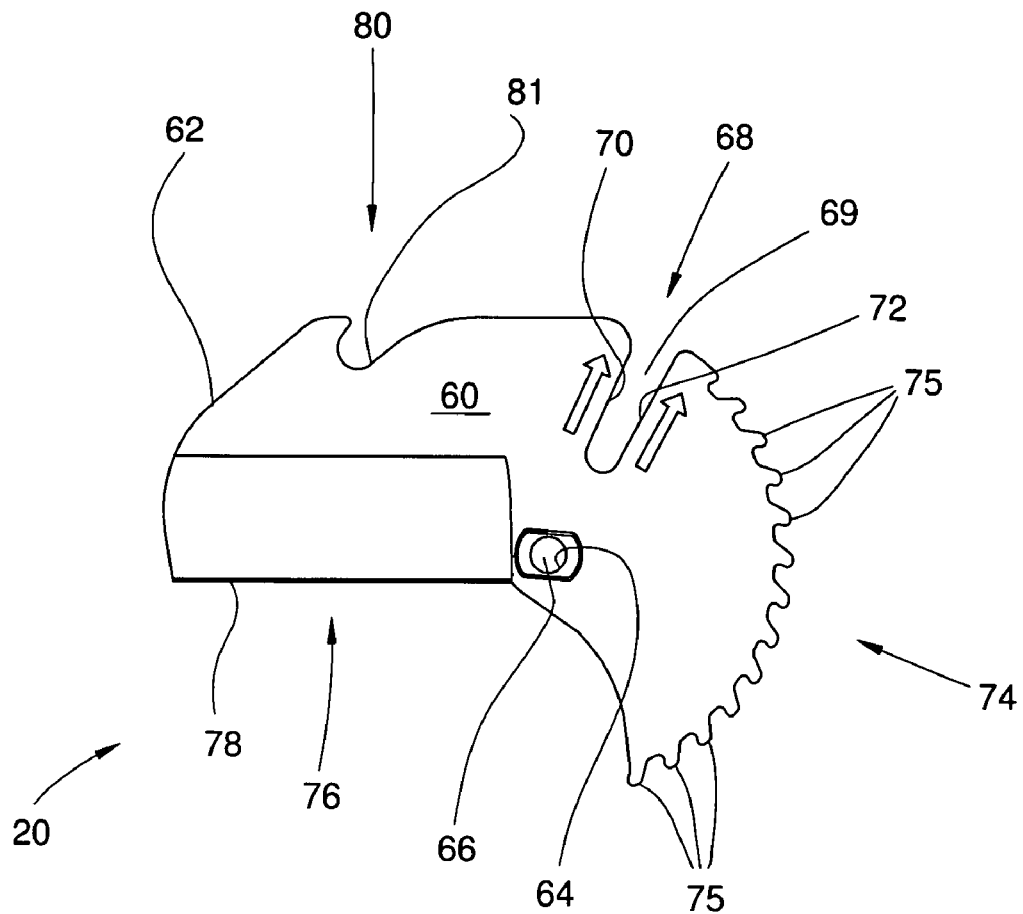
FIG. 3 is a plan view of the cutter blade of the ratchet tubing cutter of FIGS. 1 and 2.

With particular reference now to FIG. 3, the cutter blade 20 in accordance with an embodiment is shown removed from the first and second elongate members 12, 16. In general, the blade preferably includes a main body member 60 having an outer edge 62 and an inner edge 64 defining the blade pin opening 66. In accordance with the preferred embodiment, the main body member 60 generally defines an annular flat construction. As shown, the blade pin opening 66 defined by the inner edge 64 is circular. The outer edge 62, however, is circuitous and thereby defines shapes for cutting associated workpieces and for adapting the cutter blade 20 to be removed from and replaced in the tool easily and without the need for additional tools. Among the shapes formed by the edge 62, a slot portion 68 defines a slot 69 between opposed wall surfaces 70, 72 in a portion of the outer edge. The slot portion 68 is configured to selectively receive a blade sleeve 104 (FIG. 6e) during installation of the cutting blade 20 into the tool. The blade sleeve 104 is carried in the slot portion 68 during use of the tool in a manner to be described in greater detail below.

A toothed portion 74 is defined by the outer edge 62 of the main body member 60 adjacent the slot portion 68. The toothed portion 74 defines a plurality of spaced apart teeth 75 configured to engage drive and catch pawls 142, 144 (FIGS. 7a-7d) carried on the second elongate member 16 of the subject tool. The drive and catch pawls cooperate with the toothed portion 74 of the cutter blade 20 to incrementally drive the blade toward its cut off position upon manipulation of the handles of the tool.

With continued reference to FIG. 3, still further, the main body member 60 of the cutter blade 20 defines a cutting portion 76 including a sharp cutting edge 78 formed on a portion of the outer edge 62. In the embodiment illustrated, the cutting portion 76 is linear although other shapes or configurations can be used as desired such as substantially linear edges, angled shapes, curved edges, serrated edges, or the like.

Lastly with reference to FIG. 3, a notch portion 80 is defined by the outer edge 62 of the main body member 60. The notch portion 80 includes a notch 81 defined by the outer edge 62. The notch 81 is configured to engage the blade locating pin 92 (FIG. 6a) carried between the first and second halves 12a, 12b of the first elongate member 12. During installation of the cutter blade 20 into the tool 10, the blade is initially located relative to the tool body through engagement between the notch 81 and the blade locating pin 92 thereby positioning the slot portion 68 relative to the blade sleeve 104, for easily manually sliding the cutter blade in the tool body.

Referring now to FIGS. 3, 5, and 6a-6e, the preferred cutter blade receiving apparatus 90 and method for slidably loading the cutter blade 20 into the tubing cutter 10 will be described.

It is to be appreciated that removal of the cutter blade from the tubing cutter is performed by simply withdrawing the blade pivot pin 46 and extracting the blade 20 from the tool body. The blade is held in an opened and loaded position by a small spring force urging the blade against a locating pin. However, after the blade pivot pin is removed, the blade can be removed by grasping it by hand and pulling. Only a slight amount of force is needed to overcome the spring pre-load tension. In any case, however, the cutter blade is easily serviceable in the preferred embodiment without the need for additional tooling, specialized processes, or undue burden on the operator.

Figure 6A:
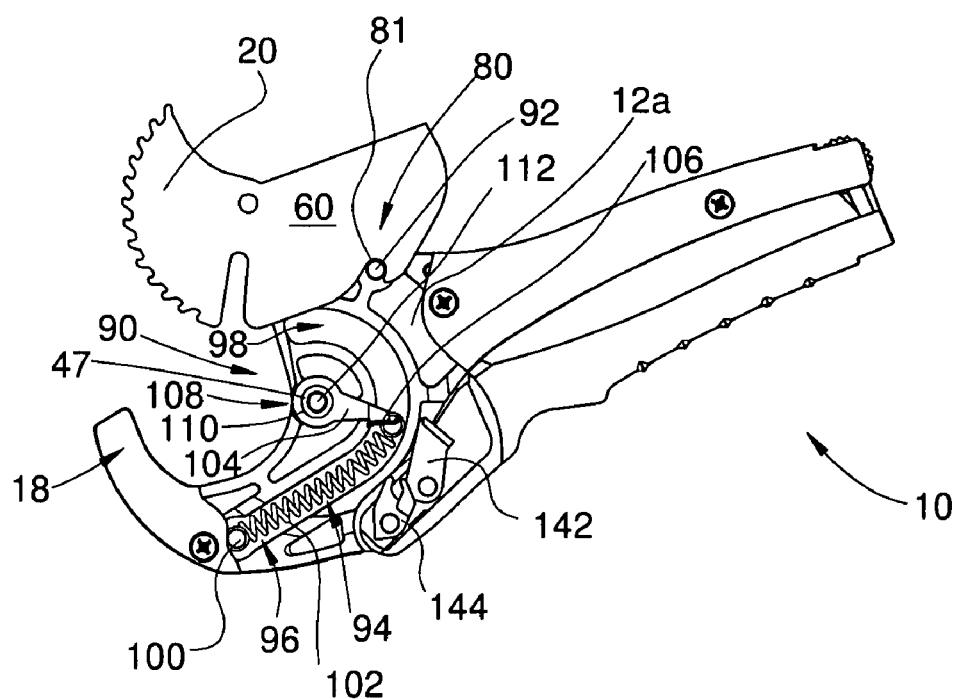
FIGS. 6a-6e are partial cross-sectional views of the subject ratchet cutting tool illustrating steps in inserting a new cutting blade into the cutter without the use of additional tools; and, FIGS. 7a-7d are partial cross-sectional views of the subject ratchet cutter tool illustrating movement of the drive and catch pawls during a ratchet cutting operation.
Figure 6B:
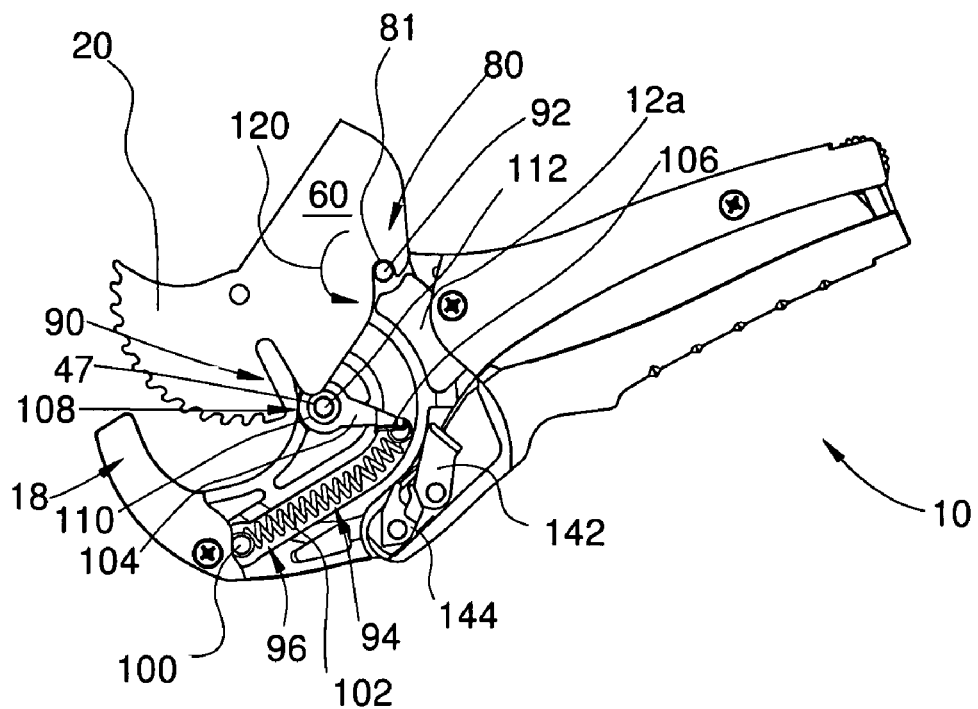
Figure 6C:
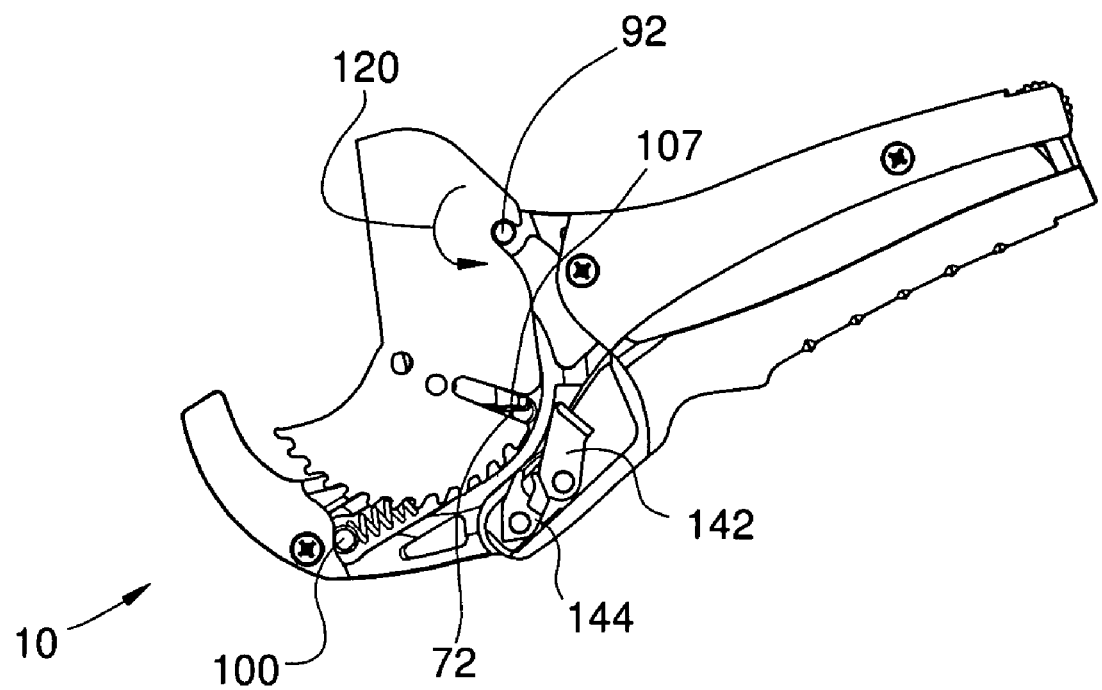
Figure 6D:
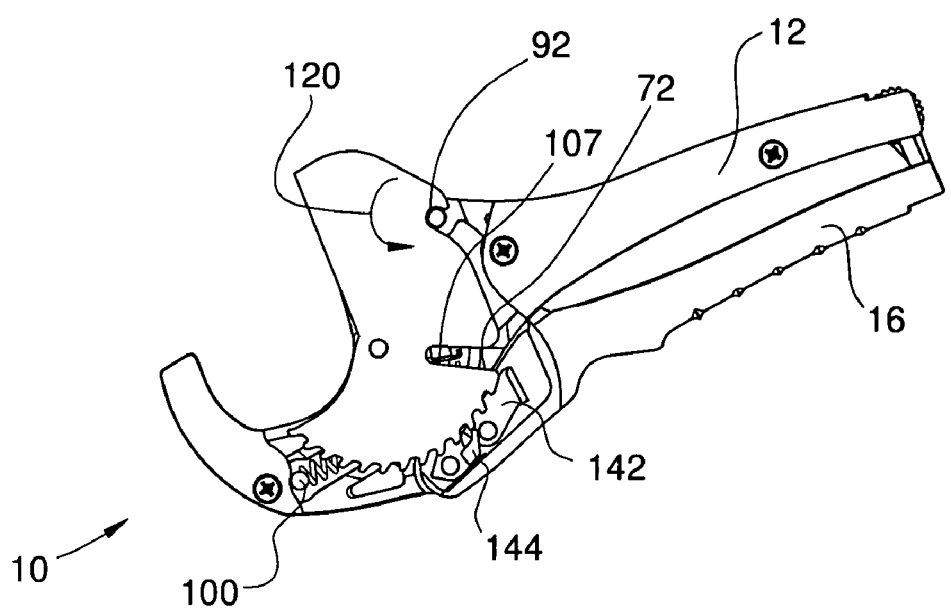
Figure 6E:
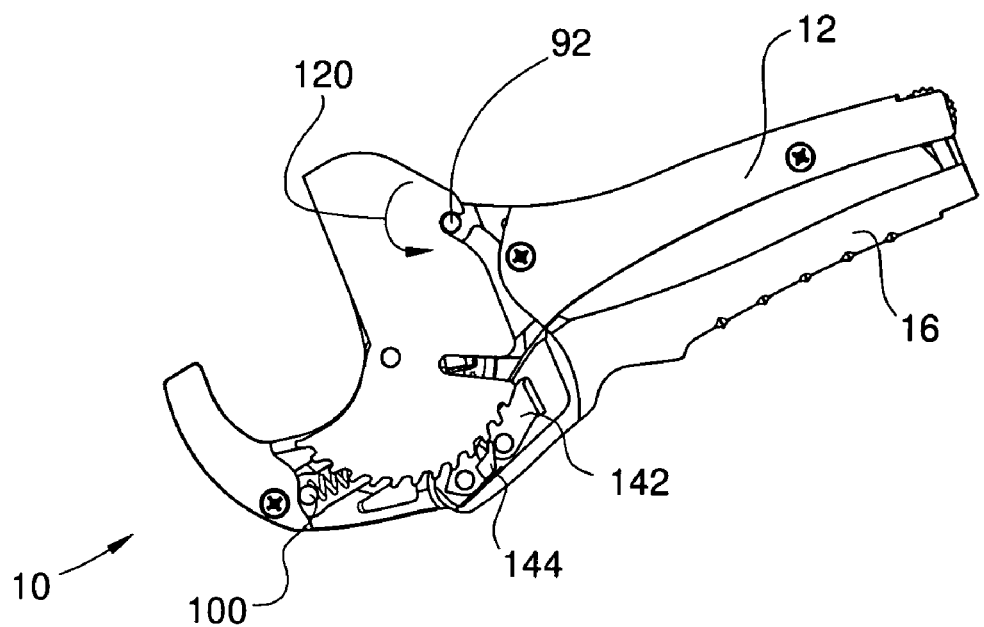

FIG. 6a shows the cutter blade 20 in an initial loading position. FIG. 6e shows the cutter blade 20 in a fully seated and pinned position and ready for cutting an associated workpiece disposed in the cradle portion 18. FIGS. 6b-6d show first, second, and third intermediate loading positions of the cutter blade 20 relative to the tubing cutter 10. It is to be appreciated that when viewing FIGS. 6a-6e only first portions of the first and second elongate members 12, 16 are illustrated in partial cutaway for purposes of clarity.

With reference first then to FIG. 6a, the cutter blade 20 is shown in an initial loading position whereat the notch portion 80 of the main body member 60 is received into the first elongate member 12. More particularly, the notch 81 defined by the notch portion 80 is in a position seated against the blade locating pin 92 of the cutter blade receiving portion 90. In the blade position illustrated, the remainder of the cutter blade receiving portion 90 is exposed and includes an arcuate J-shaped groove 94 formed in the first elongate member 12a. The groove 94 is formed into the page as viewed in FIG. 6a. The groove 94 has first and second ends 96, 98 which, as illustrated, have a substantially linear and circular conformation, respectively. A mounting post 100 extends from the base of the groove 94 at the first end 96 thereof. The mounting post 100 is configured for connection with a fixed end of a blade spring 102. Preferably, the blade spring 102 is dimensioned and has a size so as to be accommodated entirely within the groove 94. Although a post 100 and spring 102 arrangement is illustrated, other means for biasing the blade 104 relative to the tool handle 12 can be used as well, such as, for example, a torsion spring or by other mechanism or means.

The second or circular end 98 of the groove 94 is configured to receive the free end 106 of a blade sleeve 104. The blade sleeve is shown in an enlarged perspective view in FIG. 5, separate from the tool 10 for ease of description and discussion. A second end 108 of the blade sleeve 104 defines a circular opening 110 for receiving a circular raised hub portion 47 of the pin support 45 therethrough. In that way, the blade sleeve 104 is carried on the hub portion 47 and is rotatable in an arc having a center coincident with the blade axis 22. The free end 106 of the blade sleeve 104 moves through a circular arc coincident with a circular arc area defined by the second end 98 of the groove 94. In its preferred form, the blade sleeve 104 is biased towards the first end 96 of the groove 94 using the blade spring 102. More particularly, as noted above, the first end of the blade spring 102 is connected with the mounting post 100. In addition, the second end of the blade spring 102 is connected with the free end 106 of the blade sleeve 104. Although a blade spring 102 is used to bias the blade sleeve 104 into the slightly tensioned position illustrated in FIG. 6a, it is to be appreciated that other forms of biasing the blade sleeve for movement into the first end 96 and return to the initial pre-loaded position of FIG. 6a may also be used as well such as, for example, magnetic means, torsion springs, levers, or the like.

The initial loading position of the cutter blade 20 illustrated in FIG. 6a enables the blade to be rotated about the blade locating pin 92 in an arc 120 so that the lower portion of the cutter blade can be slidably moved into the first elongate member 12 such as shown in the first intermediate loading position FIG. 6b. With reference now to that figure, the cutter blade 20 is illustrated in an advanced rotational position relative to FIG. 6a whereat the slot portion 68 of the main body member 60 is positioned adjacent the blade pin opening 112. With the blade pin 46 removed from the blade pin opening 112, the cutter blade 20 is further advanced rotationally in the arc 120 whereupon contact is made between the wall surface 72 of the slot 60 and a tab portion 107 of the blade sleeve 104. As shown in FIG. 6c, the pre-loaded initial position of the blade sleeve 104 relative to the groove 94 and the location of the mounting post 100 enables the tab portion 107 of the blade sleeve 104 to be easily received into the slot 69 of the slot portion 68 defined by the main body member 60.

Next, the cutter blade 20 is further advanced into the elongate member 12 to a third intermediate loading position as shown in FIG. 6d. As illustrated, the cutter blade 20 further rotates about the mounting post 92 until the blade pin opening 66 is aligned with the blade pin opening 112 of the cutter blade receiving portion 90. At this point, both the cutter blade 20 as well as the blade sleeve 104 are oriented in a position suitable for inserting the blade pin 46 manually through the first and second elongate members 12a, 12b thereby rotatable coupling the cutter blade 20 with the main tool body in a fully seated position such as shown in FIG. 6e. It is to be appreciated that engagement between the blade slot surface 72 and the blade sleeve 104 between the positions illustrated in FIGS. 6c and 6d preloads the blade 20 relative to the blade locking pin 20 and the tool 10 in general. At the position shown in FIG. 6d the blade 20 is held in place by the force of the spring 102 acting on the blade through the blade sleeve 104.

It is to be appreciated that the process described above of inserting the cutter blade into the cutter body is easily performed manually and smoothly through a continuum of motion rather than in a stepwise process such as illustrated in the stop frame illustrations as viewed in FIGS. 6a-6e. Those views are for purposes of illustrating the installation and removal processes only and are not intended for limiting the application. Essentially, the blade can be inserted into the tool body in nearly a straight line path with the blade locating pin 92 serving essentially as an alignment indicator. Although the rotation described above occurs in the preferred embodiment, it does so only minimally and the drawings showing same do so in a somewhat exaggerated way for purposes of explanation only and not for purposes of limiting the application.

In operation and with reference next to FIGS. 7a-7d, with the cutter blade 20 in its retracted position (FIGS. 6e and 7a) and with the handle portions 28, 44 open (as shown in FIG. 1), the article to be cut is placed in the cradle portion 18. The user picks up the cutter tool 10 in one hand so that his palm bears on the handle portion 28 defined by the first elongate member 12 and so that his fingers grip the movable handle portion 44 defined by the second elongate member 16.

With the blade 20 in engagement with the article (not shown), the user then squeezes the movable handle 44 toward the stationary handle 28 so as to close the handle assembly. This in turn forces a drive pawl 142 of the cutter blade ratchet mechanism 140 into engagement with the toothed portion 74 of the main body member 60 of the cutter blade 20. As shown in the figures, preferably, the cutter blade ratchet mechanism 140 includes a drive pawl 142, a catch pawl 144, and a plurality of serrated teeth 75 defined in the toothed portion 74 of the cutter blade 20. In their preferred form, the drive and catch pawls 142, 144 are rotatably carried on respective pins 146, 148 formed by or extending from the first end 40 of the second elongate member 16. The drive pawl 142 is preferably held in the position illustrated in FIG. 7a through use of a torsion spring 143 (FIG. 2) and engagement with a portion of the tool handle 16. To that end, the drive pawl 142 is rotatable only to the right as viewed in FIGS. 7a-7b and, further, is in a fully advanced position in those FIGURES. Similarly, the catch pawl 144 is biased and held in place by a stop lock and torsion spring 145 (FIG. 2)

Figure 7A:
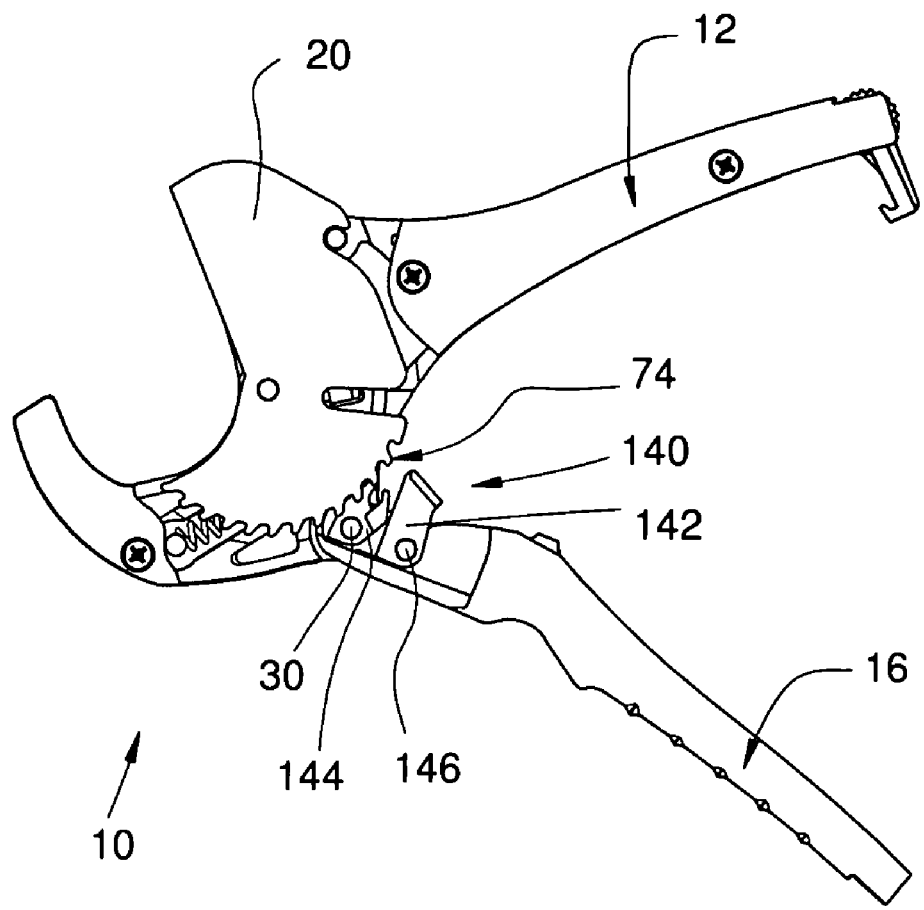
Figure 7B:
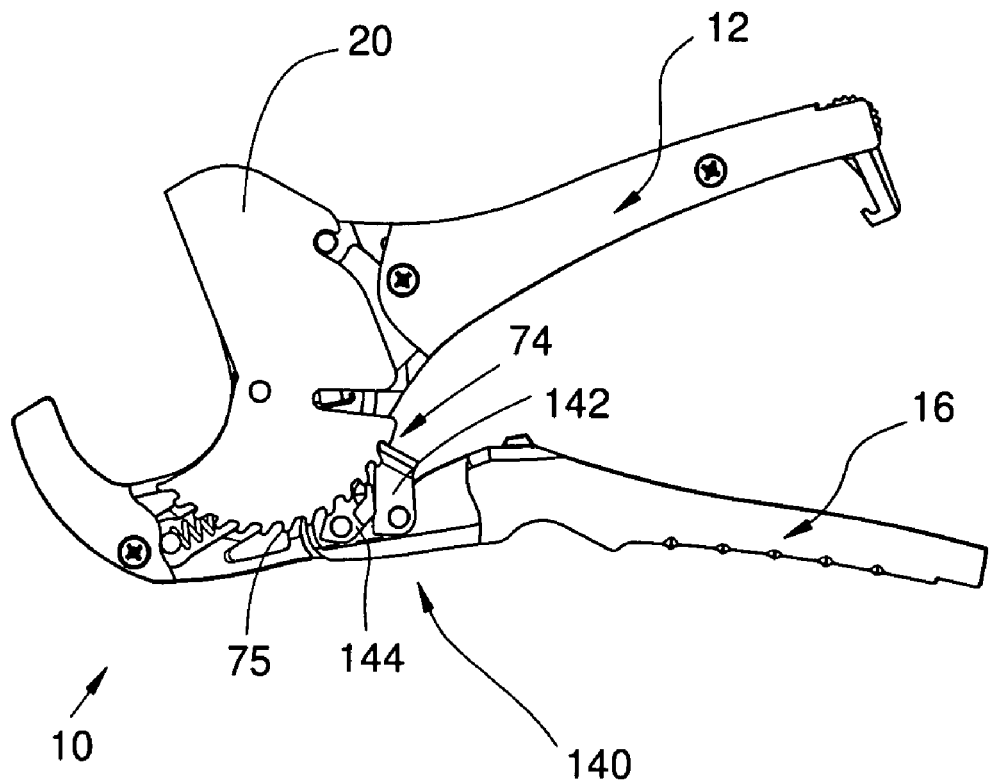
Figure 7C:
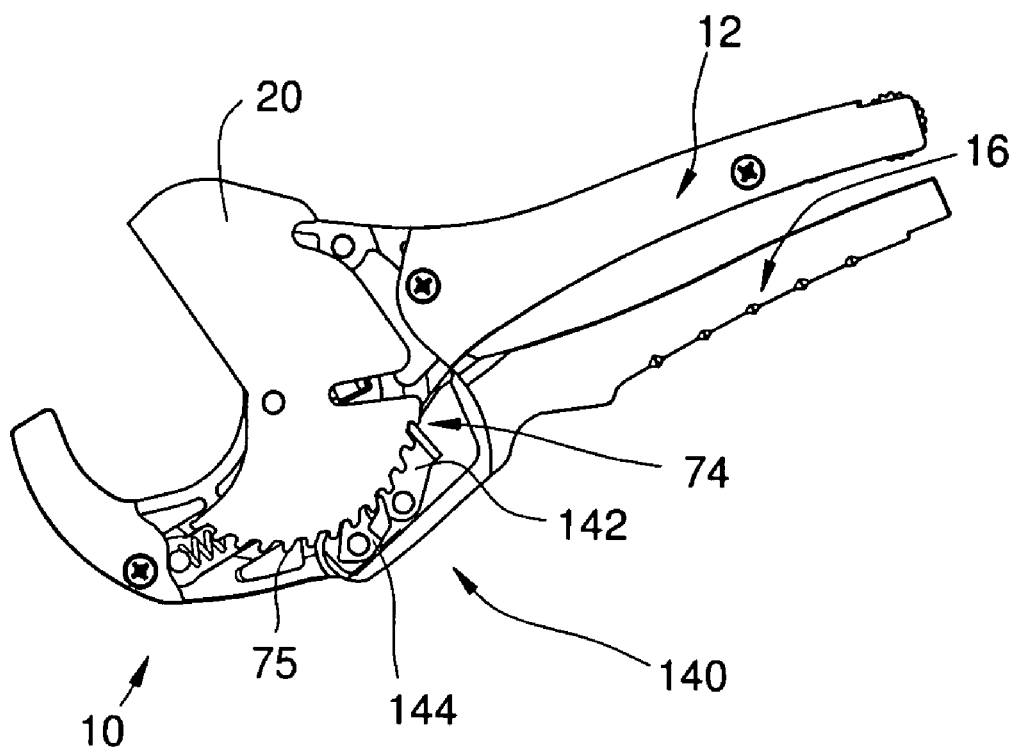
Figure 7D:
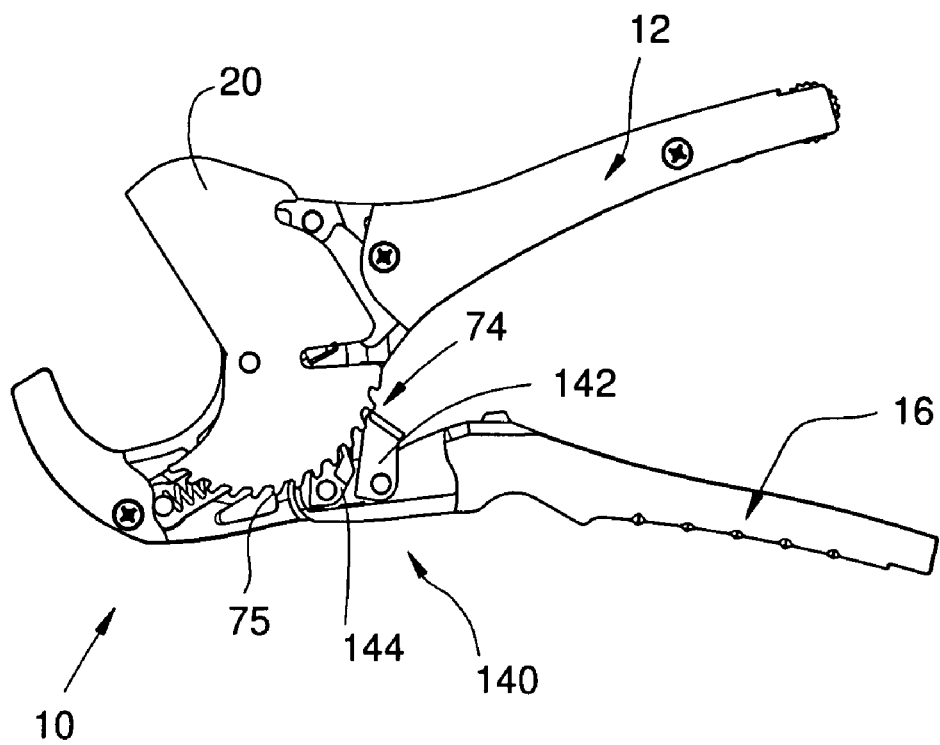

As the user squeezes the handle portions together the first end 150 of the drive pawl 142 is advanced in an arc in a manner that it engages into a first tooth 75 of the toothed portion 74 such as in a manner shown in FIG. 7b. As the user continues to squeeze the handles further together, the drive pawl 142 urges the cutter blade 20 to momentarily rotate from its retracted position toward its cut off position. This incremental movement is shown in FIG. 7c. It will be appreciated that the catch pawl 144 is so positioned as to engage a second tooth such as shown in FIG. 7d so that as the handle begins to open and as the drive pawl 42 moves out of engagement with the ratchet teeth, the blade 20 is prevented from being forced back towards its retracted position as urged in that direction by the blade spring 102. Thus, upon the user again cycling (i.e. closing) the handles, the drive pawl 142 will engage another ratchet tooth and will further index the blade 20 (i.e. move it through an increment) toward its cut off position. When it is desired to open the blade 20 and to return to its retracted position, the user merely grasps both handle portions 28, 44 and spreads them apart thereby disengaging both the drive and catch pawls 142, 144 from engagement with the toothed portion 74 of the main body member 60 such as illustrated in FIG. 7a. In that position, the blade spring 102 urges the blade sleeve 104 toward the second end 108 of the groove 94 thereby moving the blade to its retracted position.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A ratchet cutting tool comprising:
   a first handle member defining a first hand grip portion on a first end and a workpiece cradle portion on the second opposite end;
   a pin member selectively carried on the first handle member;
   a second handle member defining a second hand grip portion on a first end and being pivotably connected on a second end thereof with the first handle member;
   a blade sleeve member carried on the first handle member and biased to a first position relative to the first handle member;
   a drive pawl carried on the second handle member; and,
   a cutter blade including:
      a flat main body member defining an outer edge;
      a cutting edge defined by a cutting portion of the outer edge;
      a plurality of spaced apart teeth defined by a toothed portion of the outer edge, the plurality of teeth being configured to selectively engage the drive pawl of the cutting tool;
      a slot defined by a slot portion of the outer edge, the slot portion being configured to selectively receive the blade sleeve member when the cutter blade is installed into the first handle member;

an attachment portion on the main body member, the attachment portion being configured to selectively couple with the pin member for supporting relative rotational motion between the cutter blade and the cutting tool;

the ratchet cutting tool further comprising a locating pin member on the first handle member and wherein said cutter blade further includes:

a notch defined by a notch portion of the outer edge, the notch being configured to engage said locating pin member on the first handle member for rotating the cutter blade about the locating pin member in a first arc during a loading of the cutter blade into the ratchet cutting tool.

2. The ratchet cutting tool according to claim 1 wherein the slot portion of said cutter blade is disposed on said outer edge of the main body member adjacent said notch portion whereby, with said notch in abutting contact with said locating pin member, said slot is brought into intermating contact with the blade sleeve as the cutter blade is rotated in said first arc during said loading of the cutter blade into the ratchet cutting tool.

3. The ratchet cutting tool according to claim 2 wherein: said blade sleeve member is urged against said bias away from its said first position by said intermating contact between said slot and said blade sleeve member as the cutting blade is rotated in said first arc during said loading of the cutter blade into the ratchet cutting tool.

4. The ratchet cutting tool according to claim 3 wherein, at a terminus of said first arc in a loaded position, said cutter blade is held between said locating pin member and said blade sleeve member.

5. The ratchet cutting tool according to claim 4 further including a spring member connecting a free end of said blade sleeve member with said first handle member, the spring member providing said bias for biasing the blade sleeve member towards said first position relative to the first handle member.

6. The ratchet cutting tool according to claim 5 wherein said cutter blade is held in said loaded position by said bias of said spring member urging the notch against the locating pin member through said intermating contact between the blade sleeve member and sail slot.

7. The ratchet cutting tool according to claim 6 wherein the attachment portion of said cutter blade is disposed in a preselected position relative to said notch portion whereby the attachment portion is located at a position adjacent to the pin member of the ratchet cutting tool when the cutting blade is at said loaded positions.

8. The ratchet cutting tool according to claim 3 wherein:
the main body member of said cutter blade is annular and defines an inner edge opposite said outer edge;
said attachment portion of said cutter blade is a hole in the main body member defined by said inner edge; and,
said hole is adapted to receive said pin member therethrough to locate the cutter blade relative to the ratchet cutting tool.

9. The ratchet cutting tool according to claim 8 further including:
a retaining member on a first end of the pin member for selectively attaching the pin member with said first handle member; and,
a catch pawl carried on the second handle member and located to selectively engage said plurality of teeth of the cutter blade, the catch pawl and said drive pawl collectively forming a ratchet drive mechanism interconnecting the cutter blade and the second handle member so as to incrementally drive the cutter blade towards said workpiece cradle portion upon relative manipulation of the first and second handle members.

10. A cutter blade detachably mountable to an associated cutting tool including a first handle member defining a first hand grip portion on a first end and a workpiece cradle portion on the second opposite end, a pin member selectively carried on the first handle member, a second handle member by the pin member defining a second hand grip portion on a first end and being pivotably connected on a second end thereof with the first handle member, a blade sleeve member carried on the first handle member and biased to a first position relative to the first handle member, the blade sleeve member being rotatable about the pin and having a center of rotation coincident with the axis of rotation of the blade, and a drive pawl carried on the second handle member, the cutter blade comprising:

a flat main body member defining an outer edge;

a cutting edge defined by a cutting portion of the outer edge;

a plurality of spaced apart teeth defined by a toothed portion of the outer edge, the plurality of teeth being configured to selectively engage the drive pawl of the cutting tool;

a slot defined by a slot portion of the outer edge, the slot portion being configured to selectively receive the blade sleeve member when the cutter blade is installed into the first handle member; and, an attachment portion on the main body member, the attachment portion being configured to selectively couple with the pin member for supporting relative rotational motion between the cutter blade and the cutting tool;

the cutter blade further including:

a notch defined by a notch portion of the outer edge, the notch being configured to engage a locating pin member on the associated first handle member for rotating the cutter blade about the locating pin member in a first arc during a loading of the cutter blade into the associated cutting tool.

11. The cutter blade according to claim 10 wherein the slot portion is disposed on said outer edge of the main body member adjacent said notch portion whereby, with said notch in abutting contact with said locating pin member, said slot is brought into intermating contact with the blade sleeve as the cutter blade is rotated in said first arc during said loading of the cutter blade into the associated cutting tool.

12. The cutter blade according to claim 11 wherein the attachment portion is disposed in a preselected position relative to said notch portion whereby the attachment portion is located at a position adjacent the pin member of the associated cutting tool when the cutting blade is rotated to a terminus of said first arc during said loading of the cutting blade into the associated cutting tool.

13. The cutter blade according to claim 12 wherein:
the main body member is annular and defines an inner edge opposite said outer edge;
said attachment portion is a hole in the main body member defined by said inner edge; and,
said hole is adapted to receive said pin member therethrough to locate the cutter blade relative to the associated cutting tool.

* * * * *